(12) United States Patent  
Nozaki et al.

(10) Patent No.: US 8,104,900 B2  
(45) Date of Patent: Jan. 31, 2012

(54) ELECTRONIC DEVICE INCORPORATING PROJECTOR DEVICE

(75) Inventors: Hirotake Nozaki, Port Washington, NY (US); Nobuhiro Fujinawa, Yokohama (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 941 days.

(21) Appl. No.: 11/660,085

(22) PCT Filed: Jul. 22, 2005

(86) PCT No.: PCT/JP2005/013478
§ 371 (c)(1),
(2), (4) Date: Feb. 21, 2007

(87) PCT Pub. No.: WO2006/027901
PCT Pub. Date: Mar. 16, 2006

(65) Prior Publication Data
US 2009/0310091 A1   Dec. 17, 2009

(30) Foreign Application Priority Data
Sep. 9, 2004  (JP) .................................. 2004-262420

(51) Int. Cl.
G03B 21/14 (2006.01)
G03B 21/22 (2006.01)
H04M 1/00 (2006.01)
(52) U.S. Cl. ............ 353/79; 353/122; 353/119; 353/70; 455/575.1
(58) Field of Classification Search .................. 353/122, 353/119, 79, 69–70; 455/575.1
See application file for complete search history.

(56) References Cited

U.S. PATENT DOCUMENTS

| 5,491,507 | A  | * | 2/1996 | Umezawa et al. | 348/14.02 |
| 6,489,934 | B1 | * | 12/2002 | Klausner | 345/1.1 |
| 7,016,711 | B2 |   | 3/2006 | Kurakane | |
| 7,539,513 | B2 | * | 5/2009 | Cathey et al. | 455/556.1 |
| 2003/0092470 | A1 | * | 5/2003 | Kurakane | 455/566 |
| 2004/0017518 | A1 | * | 1/2004 | Stern et al. | 348/744 |
| 2006/0234784 | A1 | * | 10/2006 | Reinhorn | 455/575.1 |
| 2009/0051832 | A1 | * | 2/2009 | Banks et al. | 349/7 |

FOREIGN PATENT DOCUMENTS

| EP | 1 313 060 A2 | 5/2003 |
| JP | 2001-067046 A | 3/2001 |
| JP | A 2001-313702 | 11/2001 |
| JP | 2003-152851 A | 5/2003 |
| JP | A 2003-152851 | 5/2003 |
| JP | 2004-101622 A | 4/2004 |
| WO | WO 02/47364 A1 | 6/2002 |
| WO | WO 2004/023208 A1 | 3/2004 |
| WO | WO 2004023208 A1 * | 3/2004 |

OTHER PUBLICATIONS

European Application No. 05 761 985.0—Office Action dated Apr. 19, 2011.

* cited by examiner

*Primary Examiner* — Georgia Y Epps
*Assistant Examiner* — Magda Cruz
(74) *Attorney, Agent, or Firm* — Miles & Stockbridge P.C.

(57) ABSTRACT

An electronic device includes: a moving part; a projector device provided to the moving part; and a projection control unit that starts projection of an image by the projector device according to the state of the moving part, and the projection control unit starts projection of an image when a first time period has elapsed with the moving part in a predetermined state.

14 Claims, 6 Drawing Sheets

FIG.3
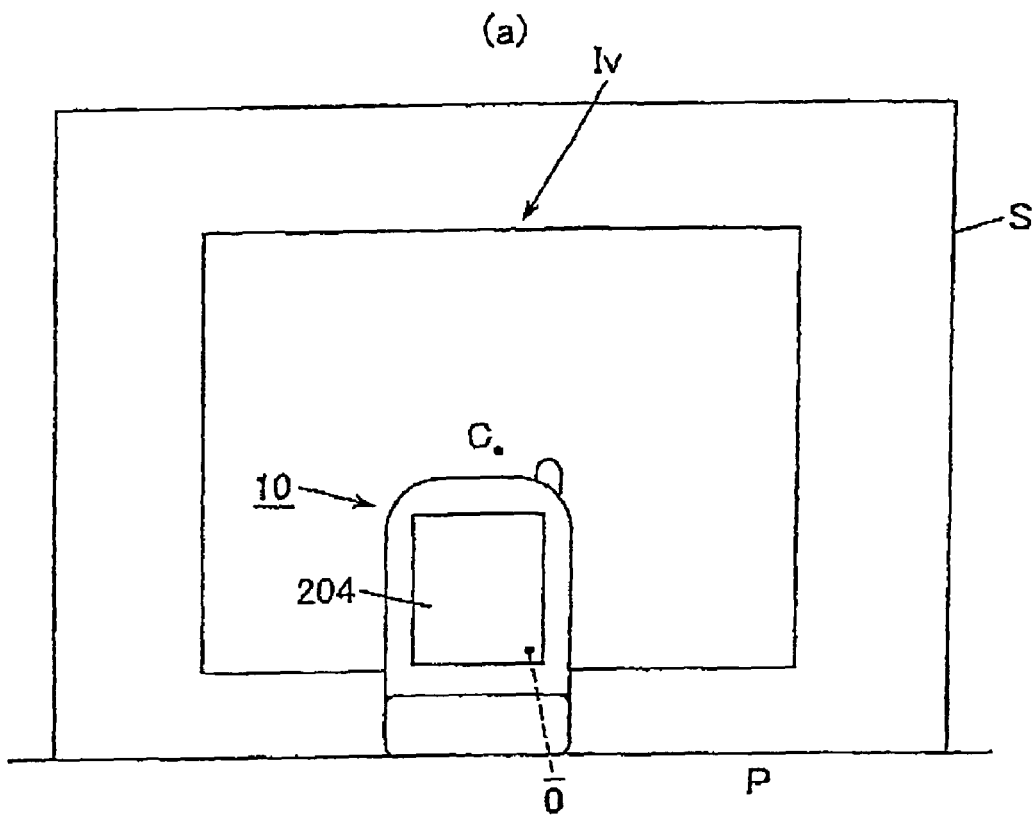
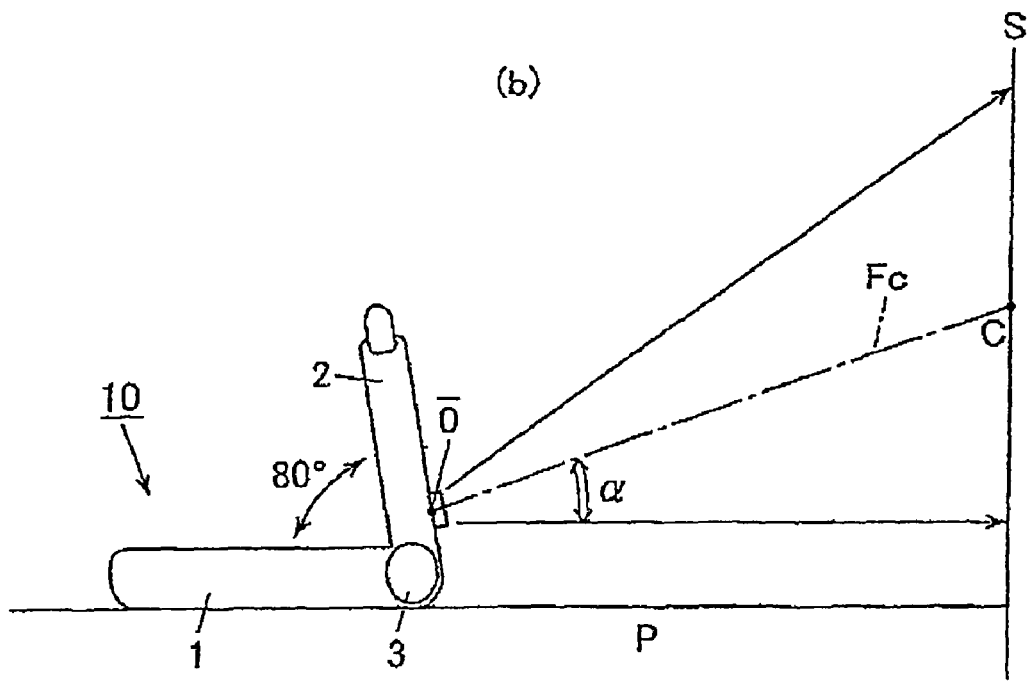

FIG.5
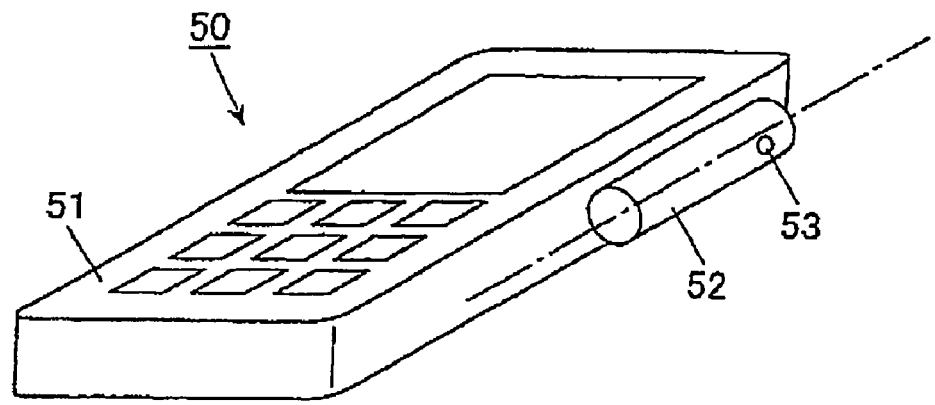
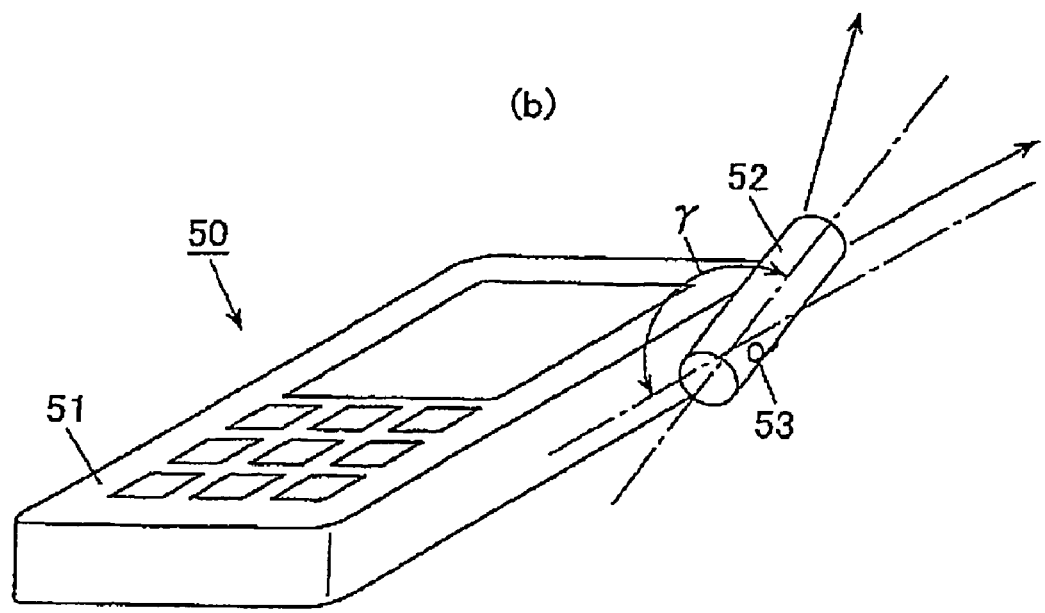

ELECTRONIC DEVICE INCORPORATING PROJECTOR DEVICE

TECHNICAL FIELD

The present invention relates to an electronic device incorporating a projector device that projects information such as images or text or the like.

BACKGROUND ART

An electronic device in which a projector is mounted to a compact device such as a portable telephone device or the like is known (refer to Patent Reference #1). In Patent Reference #1, there is disclosed a portable telephone device to which a projector which has been made compact is mounted, with the projector being fitted in a swiveling housing.
Patent Reference #1: International Publication Pamphlet WO2002/047364.

DISCLOSURE OF THE INVENTION

With the portable telephone device with incorporated projector described in Patent Reference #1, it is necessary to perform the following actuations in order to project information with the projector device. That is, since a foldable support must be moved into position for use, the power supply of the projector device must be turned ON, and the projection direction of must be adjusted by swiveling the housing, accordingly a certain number of actuation operations have been required in relation to projection, so that this takes some labor.

Means for Solving the Problems

According to the 1st aspect of the present invention, an electronic device comprises: a moving part; a projector device provided to the moving part; and a projection control unit that starts projection of an image by the projector device according to the state of the moving part.

According to the 2nd aspect of the present invention, in the electronic device according to the 1st aspect, it is preferred that the projection control unit starts projection of an image when a first time period has elapsed with the moving part in a predetermined state.

According to the 3rd aspect of the present invention, in the electronic device according to the 2nd aspect, it is preferred that after projection of the image has started, the projection control unit terminates projection of the image when a second time period has elapsed with the moving part in a state that is different from the predetermined state.

According to the 4th aspect of the present invention, in the electronic device according to anyone of the 1st through 3rd aspects, it is preferred that: there is further provided a movement detection unit that detects movement of the electronic device; and the projection control unit, when starting projection of the image by the projector device, starts projection of the image by the projector device when a third time period has elapsed during which a size of movement detected by the movement detection unit is less than or equal to a predetermined value.

According to the 5th aspect of the present invention, an electronic device, comprises: a projector device, a movement unit that detects movement of the electronic device; and a projection control unit that starts projection of an image by the projector device, when a first time period has elapsed during which a size of movement detected by the movement detection unit is less than or equal to a predetermined value.

According to the 6th aspect of the present invention, in the electronic device according to the 6th aspect, it is preferred that after projection of the image has started, the projection control unit terminates projection of the image when a second time period has elapsed during which the size of movement detected by the movement detection unit is greater than the predetermined value.

According to the 7th aspect of the present invention, in the electronic device according to the 5th or the 6th aspect, it is preferred that the movement detection unit comprises an attitude sensor, and detects the size of movement from an output value of the attitude sensor.

According to the 8th aspect of the present invention, in the electronic device according to the 5th or the 6th aspect, it is preferred that: there is further provided an image-capturing unit that captures images of an object to be photographed at predetermined time intervals and outputs image-capturing signals; and the movement detection unit detects the size of movement using interval change of the image-capturing signals outputted from the image-capturing unit.

According to the 9th aspect of the present invention, in the electronic device according to any one of the 5th through 8th aspects, it is preferred that: there is further provided a moving part; the projector device is provided to the moving part; and the projection control unit, when starting projection of an image by the projector device, starts projection of the image when a third time period has elapsed with the moving part in a predetermined state.

According to the 10th aspect of the present invention, in the electronic device according to any one of the 1st through 9th aspects, it is preferred that the electronic device is a portable telephone.

According to the 11th aspect of the present invention, in the electronic device according to any one of the 2nd, 3rd, or 9th aspect, it is preferred that: the electronic device is a portable telephone comprising an actuation section and a display section, foldable around a hinge unit as a center; the moving part corresponds to the display section; and the predetermined state is that the display section is in a predetermined angular state with respect to the actuation section.

According to the 12th aspect of the present invention, in the electronic device according to the 11th aspect, it is preferred that the projector device performs keystone correction corresponding to the predetermined angle.

It should be understood that it would be acceptable to replace the above described moving part by a movable means, the projector device by a projector means, the projection control unit by a projection control means, the detection unit by a detection means, the movement detection unit by a movement detection means, the image-capturing unit by an image-capturing means, and the hinge unit by a hinge means.

Advantageous Effect of the Invention

According to the present invention, it is possible to shorten the actuation related to projection with this electronic device with incorporated projector device.

BRIEF DESCRIPTION OF THE DRAWINGS

FIG. 3(a) is a figure showing a screen upon which this portable telephone device with incorporated projector is projecting an image, seen straight on, and FIG. 3(b) is a figure as seen from the right side of the screen;

FIG. 5(a) is a figure showing a conversation attitude of this portable telephone device with incorporated projector according to the second embodiment, and FIG. 5(b) is a figure showing a projection attitude thereof.

BEST MODE FOR CARRYING OUT THE INVENTION

In the following, the present invention will be explained in terms of certain preferred embodiments thereof and with reference to the drawings.

Embodiment 1

Figure 1:
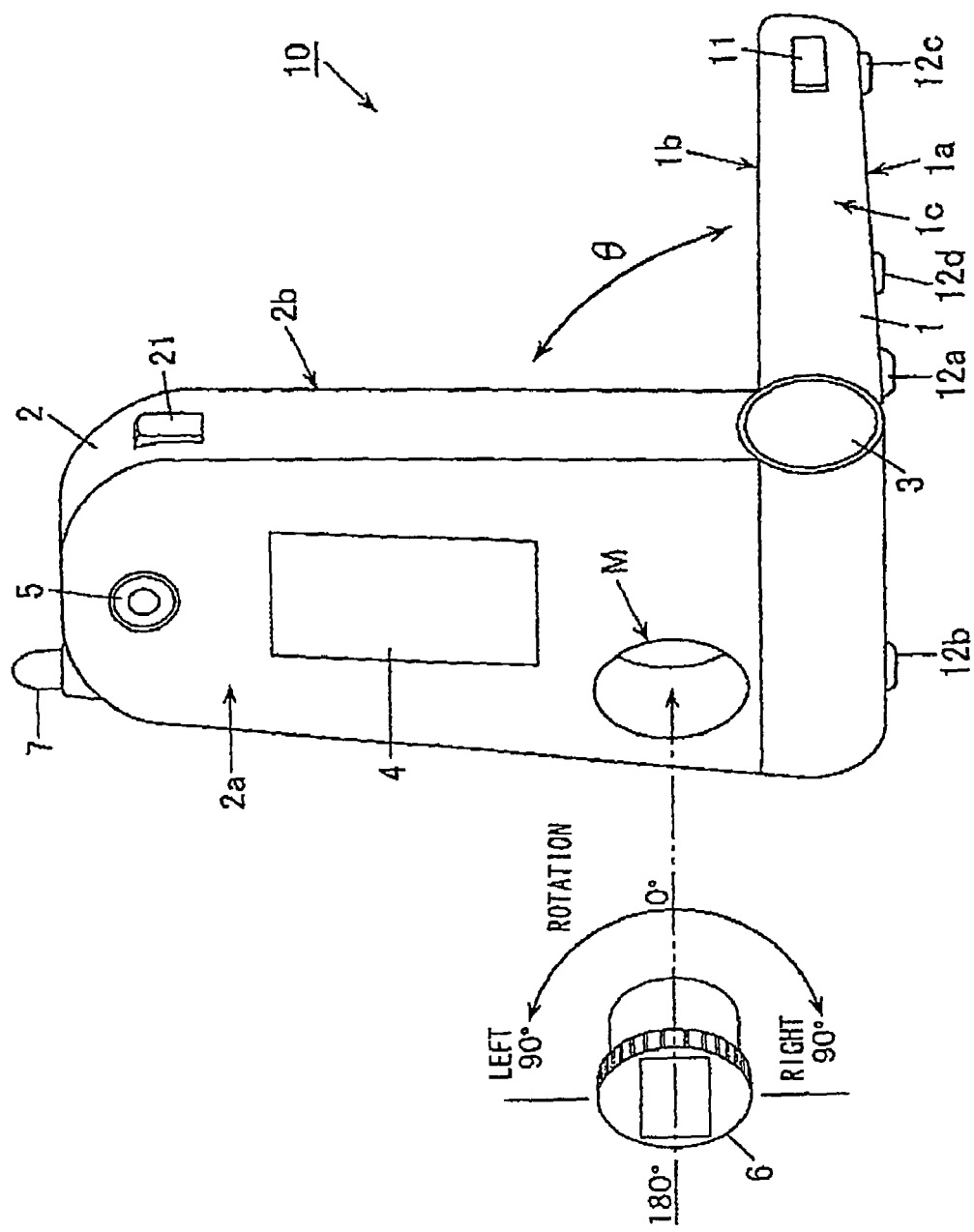
FIG. 1 is a perspective view of a portable telephone device with incorporated projector according to a first embodiment of the present invention.

FIG. 1 is a perspective view of a portable telephone device with incorporated projector 10 which can be used while hand-held, according to a first embodiment of the present invention. In the portable telephone 10 of FIG. 1, an actuation section 1 and a display section 2 are supported by a folding hinge unit 3 which can be rotated, and can be folded freely (i.e. the mode can be changed) about the folding hinge unit 3 as a rotational center. A click mechanism (not shown in the figures) is provided to the folding hinge unit 3, so that the relative angle θ between the actuation section 1 and the display section 2 can be positioned, for example, to a 80° position and to a 150° position. The 80° position corresponds to an attitude for projection by the projector unit, while the 150° position corresponds to an attitude for conversation with the telephone device. The display section 2 is a moving part which moves relative to the actuation section 1.

Compact foot portions 12a~12d are provided to the bottom surface 1a of the actuation section 1, so as to stabilize this portable telephone device with incorporated projector 10 when it has been laid upon a planar surface. A first actuation member 112 and the like which will be described herein after are provided upon the surface 1b of the actuation section 1 on the side of the display section 2, and a compact foot portion 11 is provided upon a side 1c of the actuation section 1. This compact foot portion 11 is adapted so that, when this side 1c is faced downwards and is laid upon a planar surface (i.e. is laid in a horizontal position) in the state in which the relative angle θ of the portable telephone device with incorporated projector 10 has been opened up to 80° as shown in FIG. 1 (i.e. its projection attitude), then the telephone device is laid stably upon three points: this compact foot portion 11, and also the folding hinge unit 3 and a compact foot portion 21 which is provided upon the display section 2.

A main liquid crystal unit 204 which will be described herein after is disposed upon the surface 2b of the display section 2 on the side of the actuation section 1, and a sub liquid crystal display unit 4 is disposed upon the outside surface 2a of the display section 2. A photographic lens 5 of a camera and a projector module 6 are also both disposed upon the surface 2a of the display section 2. This projector module 6 is made in a cylindrical shape and fits into a round hole M which is provided upon the surface 2a of the display section 2 so as to rotate freely therein, with a click mechanism (not shown in the figures) being provided to click at a total of three spots: a fundamental position (taken as being 0°) shown in FIG. 1, and two positions in which the projector module 6 has been rotated through 90° from this fundamental position to orientations respectively to the left and to the right with reference to that fundamental position.

Figure 2:
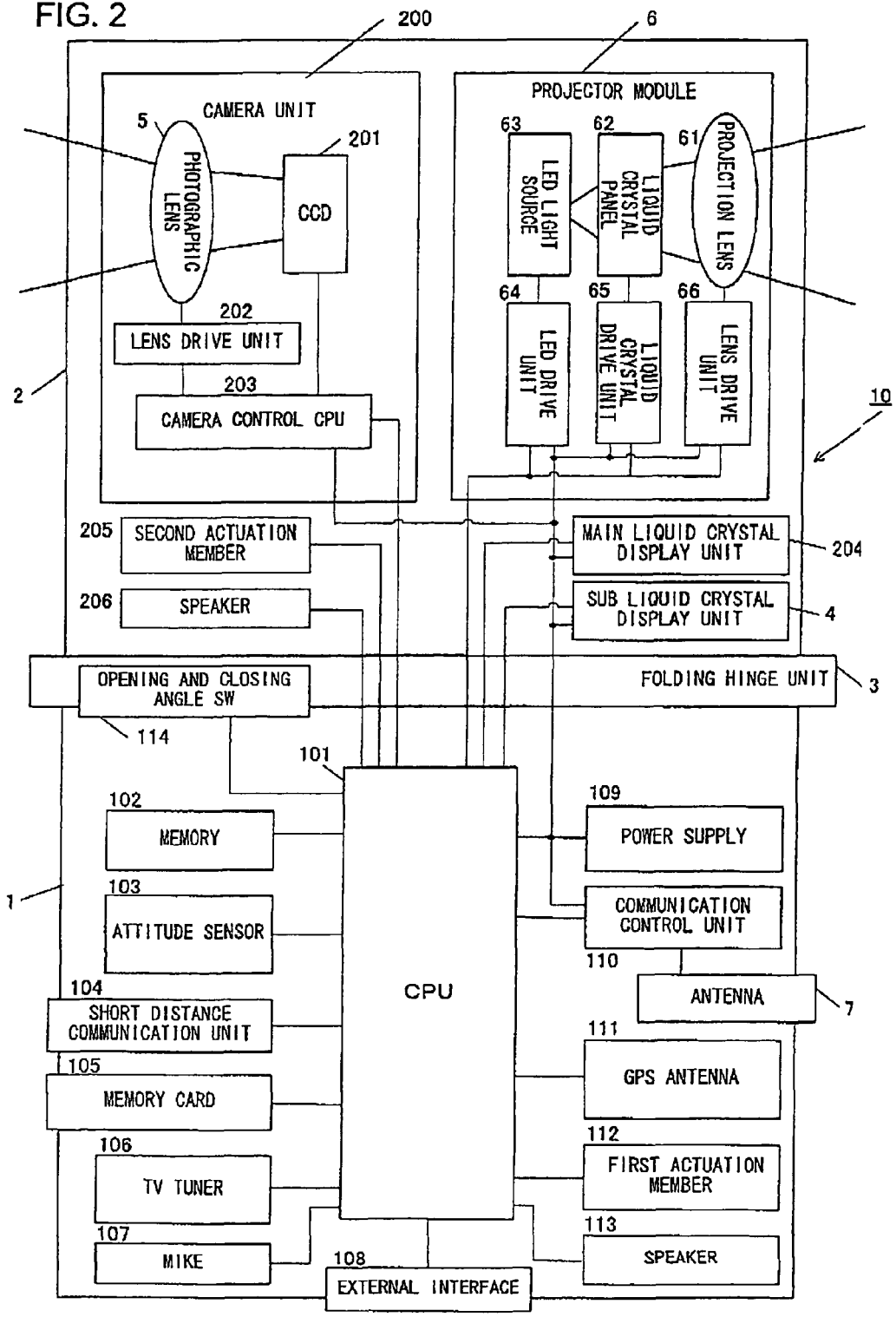
FIG. 2 is a block diagram for explanation of the structure of this portable telephone device with incorporated projector.

FIG. 2 is a block diagram for explanation of the structure of this portable telephone device with incorporated projector 10 of FIG. 1. In FIG. 2, on the side of the actuation section 1, there are provided a CPU 101, a memory 102, an attitude sensor 103, a short distance communication unit 104, a TV tuner 106, a mike 107, an external interface (I/F) 108, a power supply 109, a communication control unit 110, an antenna 7, a GPS antenna 111, the first actuation member 112, a speaker 113, and an opening and closing angle switch (SW) 114; and a removable memory card 105 is also implemented.

To the display section 2, there are provided a camera unit 200, the projector module 6 (the projector unit), a second actuation member 205, a speaker 206, the main liquid crystal unit 204, and the sub liquid crystal unit 4.

Based upon a control program, the CPU 101 performs predetermined calculation and the like using signals inputted from various units incorporated in this portable telephone device with incorporated projector 10, and controls each of telephone device operation, camera operation, and projector operation by sending control signals to various units of this portable telephone device with incorporated projector 10. It should be understood that this control program is stored in a non-volatile memory (not shown in the figures) within the CPU 101.

The memory 102 is used as a working area for the CPU 101. The attitude sensor 103 detects the attitude of this portable telephone device with incorporated projector 10, and sends its detection signal to the CPU 101. Due to this, the CPU 101 acquires top and bottom information which specifies the top and the bottom of an image during photography (including information for identifying photography with the camera in the vertical position and photography with the camera in the horizontal position), and, when the projector is being used, decides whether it is placed in the vertical position as shown in FIG. 1, or is placed in the horizontal position with the compact foot portions 11 and 21 and the folding hinge unit 3 downwards.

The short distance communication unit 104 may comprise, for example, an infrared radiation communication circuit, and transmits and receives data to and from an external device upon command by the CPU 101. The TV tuner 106 receives a television broadcast upon command by the CPU 101. The CPU 101 displays the received image upon the main liquid crystal display unit 204, and replays the received audio upon the speaker 206. The memory card 105 comprises a non-volatile memory, and, upon command by the CPU 101, it is capable of writing, storing, and reading out data such as, for example, image data outputted by the camera unit 200, images and audio data outputted by the TV tuner 106, and the like.

The mike 107 converts audio which has been captured into an electrical signal and sends it to the CPU 101 as an audio signal. This audio signal is recorded in the memory card 105 during sound recording, and is sent to the communication control unit 110 during conversation. The external interface 108 transmits and receives data to and from an external device via a cable or a cradle, not shown in the figures, upon command by the CPU 101.

The speaker 113 replays the audio of an audio signal outputted from the CPU 101. The first actuation member 112 includes dial buttons for a telephone device and the like, and sends actuation signals to the CPU 101 corresponding to the buttons which are pressed. The GPS antenna 111 receives signals from GPS satellites, and sends the received data to the CPU 101. The CPU 101 is adapted to be able to calculate positional information using this data received from the GPS antenna 111. The communication control unit 110 includes a wireless transmission and reception circuit, and performs communication with other telephone devices via a base station not shown in the figures, upon command by the CPU 101. This communication control unit 110 is adapted so as to be able to transmit and receive, not only telephone audio, but also image data which has been photographed by the camera unit 200, image data for projection by the projector module 6, and the like. And the antenna 7 is a transmission and reception antenna for the communication control unit 110.

The power supply 109 may consist of, for example, a removable battery pack and a DC/DC conversion circuit or the like, and supplies the various sections within the portable telephone device with incorporated projector 10 with the electrical power which they require. The opening and closing angle SW 114 detects the rotational angle of the folding hinge unit 3, and sends an ON signal to the CPU 101 if it detects that the relative angle θ between the actuation section 1 and the display section 2 is 80° (the projection attitude), while it sends an OFF signal for any other than the angle described above.

The main liquid crystal display unit 204 displays information such as an image or text or the like upon a command from the CPU 101. The sub liquid crystal display unit 4 also displays information such as an image or text or the like upon a command from the CPU 101. The second actuation member 205 includes a button or the like which is related to the displayed contents upon the main liquid crystal display unit 204, and sends an actuation signal to the CPU 101 according to this button being depressed. And the speaker 206 replays audio which is outputted from the CPU 101 as a sound signal, during the conversation attitude when the relative angle θ is 150°.

The camera unit 200 comprises the photographic lens 5, an image sensor 201, a lens drive unit 202, and a camera control CPU 203. As the image sensor 201, a CCD or CMOS image sensor or the like may be used. The camera control CPU 203 drives and controls the image sensor 201 and the lens drive unit 202 upon a command from the CPU 101. Upon receipt of a zoom control signal from the camera control CPU 203, the lens drive unit 202 drives a zoom lens (not shown in the figures which is incorporated in the photographic lens 5 to a tele side or to a wide side. The photographic lens 5 images an image of the object to be photographed upon the photographic surface of the image sensor 201. The camera control CPU 203 starts this photography or image-capturing upon the image sensor 201, and, after the end of photography, reads out an accumulated electric charge signal from the image sensor 201, and, after having performed predetermined signal processing thereupon, sends it to the CPU 101 as image data. It should be understood that, when image data which has been photographed by the camera unit 200 is to be transmitted, image data is sent from the CPU 101 to the communication control unit 110. Furthermore, when a photographic image is to be projected, image data is sent from the camera control CPU 203 via the CPU 101 to the projector module 6. In the CPU 101, trapezoidal deformation correction (keystone correction) processing is performed upon the image data to be projected by the projector module 6.

The projector module 6 comprises a projection lens 61, a liquid crystal panel 62, a LED light source 63, a LED drive unit (circuit) 64, a liquid crystal drive unit (circuit) 65, and a lens drive unit (circuit) 66. The LED drive unit 64 supplies electrical current to the LED light source 63 according to a LED drive signal which is outputted from the CPU 101. And the LED light source 63 illuminates the liquid crystal panel 62 at a brightness corresponding to the electrical current which is supplied.

The liquid crystal drive unit 65 generates a liquid crystal panel drive signal corresponding to the image data, and this generated drive signal drives the liquid crystal panel 62. In concrete terms, in the liquid crystal layer, a voltage is applied to each of the pixels in correspondence to the image signal. The arrangement of the liquid crystal molecules changes in the liquid crystal layer to which voltage has thus been applied, so that the optical transmittivity of this liquid crystal layer changes. By modulating the light from the LED light source 63 in this manner according to the image signal, the liquid crystal panel 62 creates an optical image.

Based upon a control signal outputted from the CPU 101, the lens drive unit 66 drives the projection lens 61 forward and backward along a direction which is orthogonal with respect to the optical axis of the projection lens 61. The projection lens 61 projects the optical image which has been emitted from the liquid crystal panel 62 towards a screen or the like.

The image projection by the projector module 6 will now be described in detail. This portable telephone device with incorporated projector 10 starts projection automatically when the relative angle between the actuation section 1 and the display section 2 is set to the projection attitude of 80°, and when a predetermined time period has elapsed. FIG. 3 is a figure for explanation of an image Iv which is projected upon a screen S which has been placed upon a plane P from this portable telephone device with incorporated projector 10. FIG. 3(*a*) is a figure in which the screen S is seen in a straight on orientation, while FIG. 3(*b*) is a figure in which the screen S is seen from its right side. In FIG. 3(*a*), the central point C of the projection light flux (light flux) of the projected image Iv is offset in the upwards direction from the center of the aperture of the projector module 6. In other words, as shown in FIG. 3(*b*), by the center line Fc of the projection light flux being adjusted to the projection angle of the angle α with respect to a horizontal line, the lower edge of the projection light flux is made to face parallel to or above the plane P. It should be understood that the rotation position of the projector module 6 is set to 0°. Furthermore, the point C in the figure shows the center of the light flux which is projected (the center of the projected image Iv), and the line which connects the aperture center O and the point C corresponds to the center line Fc of the light flux.

Although the offset of the projection image is obtained by the above described projection angle α, up till now, the projected image is trapezoidal in shape, which is not desirable. Thus, a lens movement effect is obtained by shifting the projection lens 61 with the above described lens drive unit 66, and, by performing keystone correction (trapezoidal deformation correction) upon the display data to be projected corresponding to this lens movement effect, the projection image Iv is corrected to a square shape. With regard to the lens shift amount and keystone correction amount, an initial correction value for correcting the projection image Iv to a square shape in the above described state of the 80° projection attitude is stored in the CPU 101 in advance. In other words, keystone correction is performed according to the relative angle θ.

Figure 4:
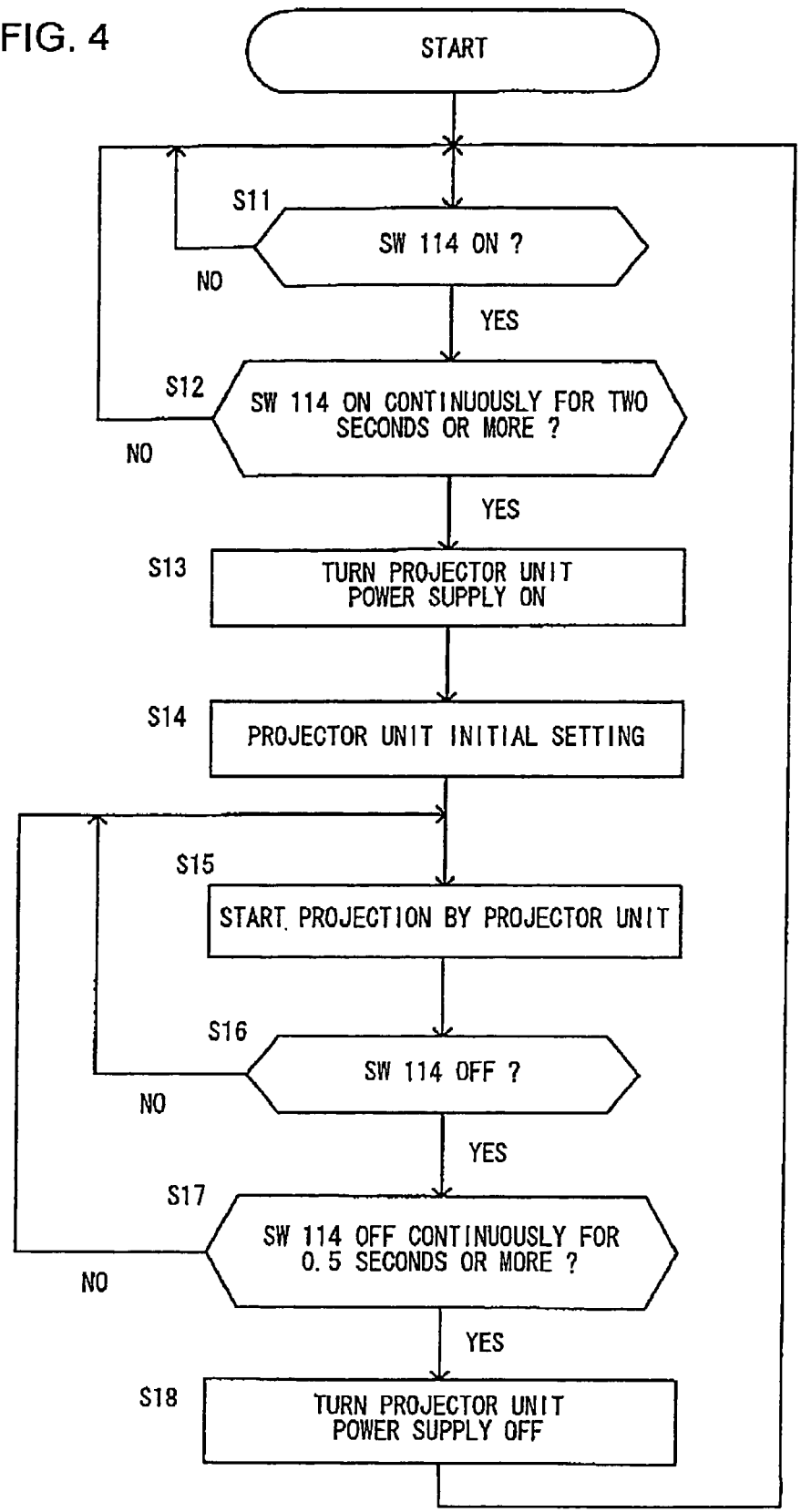
FIG. 4 is a flow chart for explanation of the flow of a projector control procedure.

FIG. 4 is a flow chart for explanation of the flow of the projector control procedure performed by the CPU 101. The processing of FIG. 4 is performed repeatedly while the power supply switch of this portable telephone device with incorporated projector 10 is turned ON. In a step S11 of FIG. 4, the CPU 101 decides whether or not the opening and closing angle switch 114 is ON. If the CPU 101 inputs an ON signal from the opening and closing angle switch 114 (in other words, if the relative angle between the actuation section 1 and the display section 2 is the projection attitude of 80°), then an affirmative decision is made and the flow of control proceeds to a step S12, while if an ON signal is not inputted from the opening and closing angle switch 114 (in other words, if the device is not in its projection attitude), then a negative decision is made and this decision processing is repeated.

In the step S12, the CPU 101 decides whether or not the ON signal from the opening and closing angle switch 114 has continued for greater than or equal to 2 seconds. If this ON signal has continued for greater than or equal to 2 seconds, then the CPU 101 makes an affirmative decision in the step S12 and the flow of control proceeds to a step S13, while if the continuation time period is less than 2 seconds then the flow of control returns to the step S11. By doing this, it is ensured that the step S13 is not proceeded to even if the ON signal has been outputted from the opening and closing angle switch 114 temporarily, during the process in which the portable telephone device with incorporated projector 10 is opened up from its folded state, or during the process of folding it up from its state in which it is opened.

In a step S13, the CPU 101 turns the power supply to the projector module ON, and then the flow of control proceeds to a step S14. In concrete terms, it issues a command to the power supply 109 to start supply of electrical power to the projector module 6. And, in the step S14, the CPU 101 performs initial setting of the projector module 6, and then the flow of control proceeds to a step S15. This initial setting includes initialization of the liquid crystal drive unit 65, causing the lens drive unit 66 to perform lens shifting according to the above described initial correction value, and keeping the LED light source 63 OFF.

And, in a step S15, the CPU 101 starts projection by the projector module 6, and then the flow of control proceeds to a step S16. In concrete terms, it issues a command to the liquid crystal drive unit 65 to create the same contents upon the liquid crystal panel 62 as the contents being displayed upon the main liquid crystal unit 204, and, after it has turned the display upon the main liquid crystal unit 204 OFF, it issues a command to the LED drive unit 64 to turn the LED light source 63 ON. Due to this, the first contents projected by the projector module 6 (i.e. the initial screen) is the same contents as those displayed upon the main liquid crystal unit 204. After this initial screen, the contents projected by the projector module 6 can be changed appropriately to an image which is being photographed by the camera unit 200, a broadcast screen which is being received by the TV tuner 106, information which is being received by the communication control unit 110, or the like; but, in the flow chart of FIG. 4, the processing for selecting these is omitted.

Next, in a step S16, the CPU 101 decides whether or not the opening and closing angle switch 114 is OFF. If an OFF signal is being inputted from the opening and closing angle switch 114 (in other words, if the projection attitude in which the relative angle between the actuation section 1 and the display section 2 is 80° has been quitted), then the CPU 101 makes an affirmative decision and the flow of control proceeds to a step S17, while if an OFF signal is not being inputted from the opening and closing angle switch 114 (in other words, if the device is still in its projection attitude), then a negative decision is made in this step S16 and the flow of control returns to the step S15. Due to this, the state of the opening and closing angle switch 114 is always being monitored during projection by the projector module 6.

In the step S17, the CPU 101 decides whether or not the OFF signal from the opening and closing angle switch 114 has continued for greater than or equal to 0.5 seconds. If this OFF signal has continued for greater than or equal to 0.5 seconds, then the CPU 101 makes an affirmative decision in this step S17 and the flow of control proceeds to a step S18, while if the continuation time period is less than 0.5 seconds then the flow of control returns to the step S15. By doing this, it is ensured that the step S18 is not proceeded to even if the OFF signal has been outputted from the opening and closing angle switch 114 temporarily, due to the portable telephone device with incorporated projector 10 being touched inadvertently during projection.

In the step S18, the CPU 101 stops projection by the projector module 6, and then the flow of control returns to the step S11. In concrete terms, along with issuing a command to the LED drive unit 64 to turn the LED light source 63 OFF, the CPU again displays upon the main liquid crystal unit 204 the contents which were displayed upon that main liquid crystal unit 204 before projection by the projector module 6 was started.

According to the first embodiment explained above, the following beneficial operational effects are obtained. (1) With this portable telephone device with incorporated projector 10, when the predetermined time period (in the example described above, 2 seconds) elapses (an affirmative decision in the step S12) in the state of the projection attitude in which the relative angle between the actuation section 1 and the display section 2 is 80°, then the projection of information by the projector module 6 is performed automatically. Due to this, since only the mode or state needs to be changed to the projection attitude, the actuation before projection can be simplified and the convenience is enhanced. Furthermore, since projection is performed when the projection attitude is continued over two seconds, accordingly unnecessary performance of projection is prevented, even if the relative angle becomes 80° temporarily, as during the process in which this portable telephone device with incorporated projector 10 is being opened up to its conversation attitude from its folded up state, or during the process in which it is being folded up from its conversation attitude.

(2) The shape of the projection image Iv is corrected to a square form by a combination of the lens movement effect due to lens shifting and of the keystone correction using image processing, so that the image Iv which is projected upon the screen S is not formed in a trapezoidal shape. The required lens shift amount and keystone correction amount in order to obtain a projection image Iv of a square shape in the projection attitude are stored in advance in the CPU 101 as initial correction values, and, before starting projection, the correction is automatically performed according to these initial correction values (in the step S14). Accordingly, it is not necessary to perform correction actuation while checking the projection image after the start of projection, so that the convenience of use as a projector is enhanced, since the actuation after the start of projection can be simplified.

(3) With this portable telephone device with incorporated projector 10, when 0.5 seconds or greater elapses in the state in which the device is not in the projection attitude (an affirmative decision in the step S17), then it is arranged to terminate the projection of information by the projector module 6 automatically (in the step S18). Since it is arranged for continuation for 0.5 seconds to be a necessary condition for termination, accordingly it is possible to prevent termination of projection contrary to the intentions of the user, if during projection the portable telephone device with incorporated projector 10 should be touched inadvertently.

In the step S12 of the flow chart of FIG. 4, it would also be acceptable to arrange for the decision to be made in accordance with whether the portable telephone device with incorporated projector 10 is mounted in a stable manner upon a stand or the like. In other words the decision would be made if both the portable telephone device with incorporated projector 10 is in its projection attitude, and also the portable telephone device with incorporated projector 10 is mounted in a stable manner. In this case, the flow of control proceeds to the step S13 if the ON signal from the opening and closing angle switch 114 has been continued for greater than or equal to 2 seconds, and if also change of the signal detected by the attitude sensor 103 has continued to be less than a predetermined value for greater than or equal to 2 seconds; while otherwise, if the ON signal from the opening and closing angle switch 114 has continued for less than 2 seconds, or if change of the signal detected by the attitude sensor 103 is greater than the predetermined value, then the flow of control returns to the step S11. By detecting both the projection attitude and the mounting state, it is possible to decide reliably upon the situation in which the projector is being used, and it is possible to proceed reliably to the projection processing.

Furthermore it would also be acceptable to arrange to make the decision in the step S12 described above, only according to whether the portable telephone device with incorporated projector 10 is mounted in a stable manner. In this case, the flow of control proceeds to the step S13 if the change of the signal detected by the attitude sensor 103 has continued to be less than a predetermined value for greater than or equal to 2 seconds; while otherwise, if the change of the signal detected by the attitude sensor 103 is greater than the predetermined value, then the flow of control returns to the step S11. Even if only the state of being stably mounted is detected, it is possible to decide reliably upon the situation in which the projector is being used, and it is possible to proceed reliably to the projection processing. It should be understood that, if the projection processing is proceeded to by deciding that the portable telephone device with incorporated projector 10 is mounted in a stable manner, then projection is terminated if this decision of stable mounting ceases. In this case, if in the step S17 the state in which the change of the signal detected by the attitude sensor 103 exceeds the predetermined value continues for 0.5 seconds, then the flow of control proceeds to the step S18 and projection is terminated.

It would also be acceptable, for detecting the state of whether the portable telephone device with incorporated projector 10 is mounted stably or not, instead of using the signal from the attitude sensor 103, to arrange to detect this state using the image data which is obtained by the camera unit 200. In this case, images of an object to be photographed are shot by the camera unit 200 at predetermined time intervals. And the CPU 101 detects the mounting state of the portable telephone device with incorporated projector 10, each predetermined time interval, by comparing the image data 200 which are sent from the camera unit 200 with the directly previous image data. If the difference from the directly previous image data (i.e. the change in that time interval) is greater than a predetermined value, then it is decided that the portable telephone device with incorporated projector 10 is not mounted, while, if the above described interval difference is less than or equal to the predetermined value, then it is decided that the portable telephone device with incorporated projector 10 is mounted in a stable manner.

Embodiment 2

FIG. 5 is a perspective view of a portable telephone device with incorporated projector 50 according to a second embodiment of the present invention; FIG. 5(a) is a figure showing it in a conversation attitude, while FIG. 5(b) is a figure showing it in a projection attitude. In FIGS. 5(a) and 5(b), a structure is shown in which a cylindrical shaped housing 52 is rotatably supported upon the portable telephone device main body 51 by a support portion 53, with the housing 52 being freely rotatable (so that the state can be changed) around the support portion 53 as a rotational center. A click mechanism (not shown in the figures) is provided to the support portion 53 for setting the housing 52 to, for example, either a position in which the relative angle γ between the portable telephone device main body 51 and the housing 52 is equal to 0°, or a position in which this angle is equal to 150° (FIG. 5(b)). 0° corresponds to the conversation attitude of the telephone device, while 150° corresponds to the projection attitude of the projector module 6.

A projector module (not shown in the figures) which is the same as the one in the portable telephone of the first embodiment is contained within the housing 52, and it is arranged for the projection light flux produced thereby to be outputted from the opposite side of the housing 52 to the support portion 53. A switch (also not shown in the figures) is also provided to the housing 52 for detecting the rotational angle of the housing 52, and this switch outputs an ON signal (H level) when it detects that the relative angle γ between the portable telephone device main body 51 and the housing 52 is equal to 150° (i.e. the projection attitude), while it outputs an OFF signal (L level) if that angle is equal to any other value.

The CPU of the portable telephone device main body 51 performs projection of information by the projector module automatically, if a predetermined time period (or example of 2 seconds) elapses in the state in which the relative angle γ is equal to 150°. Due to this, in the same manner as in the case of the first embodiment, the convenience of use is enhanced since the actuation required for projection is simplified, and it is also possible to prevent unnecessary projection when temporarily the relative angle γ passes through the state of being equal to 150°.

Embodiment 3

Figure 6:
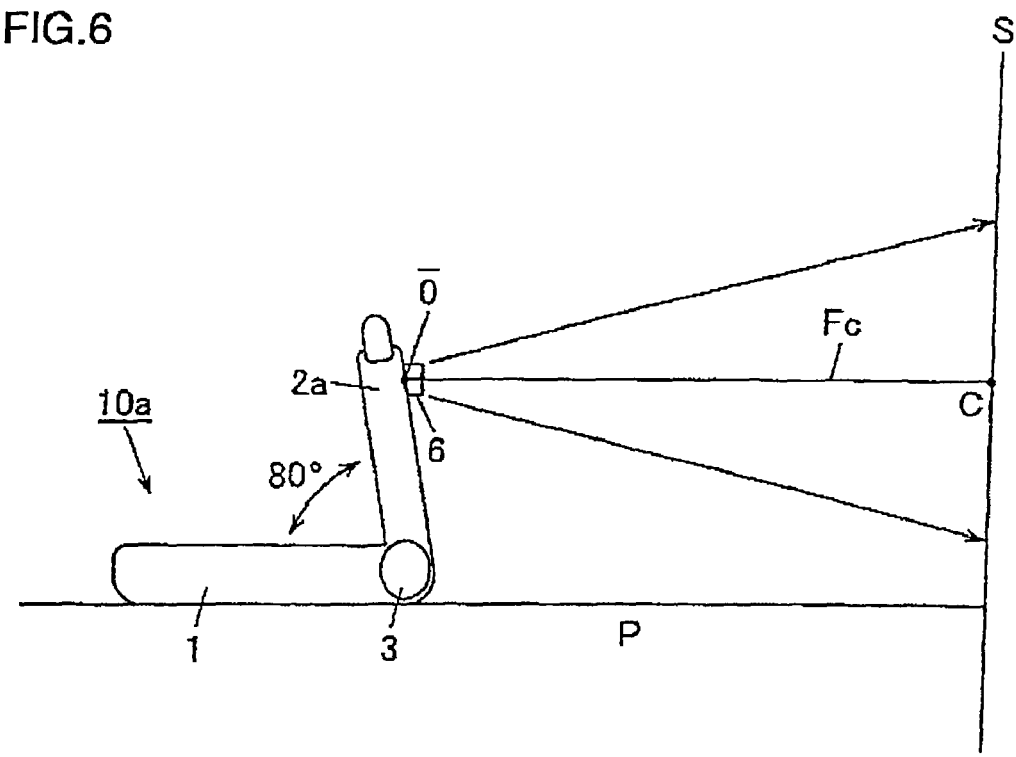
FIG. 6 is a figure for explanation of a portable telephone device with incorporated projector according to a third embodiment.

FIG. 6 is a figure for explanation of a portable telephone device with incorporated projector 10a according to a third embodiment of the present invention. As compared to the portable telephone device with incorporated projector 10 of the first embodiment, the position at which the projector module 6 is disposed and the projection direction are different.

The portable telephone device with incorporated projector 10a automatically start projection when the relative angle between its actuation section 1 and its display section 2a is set to the projection attitude of 80° and a predetermined time period elapses. In FIG. 6, the structure is such that, in the projection attitude, the center O of the aperture of the projector module 6 is disposed in a position separated from the plane P, and the center line Fc of the projection light flux proceeds parallel to the plane P. The point C in the figure indicates the center of the light flux which is projected, and the line joining the center O of the aperture and the point C corresponds to the above described center line Fc of the light flux.

In the structure shown in FIG. 6, in addition to enhancing the convenience of use by simplifying actuation for projection, it is also possible to make keystone correction unnecessary, since it is possible to make the lengths of the optical paths equal between the upper edge and the lower edge of the projection light flux. As a result, it is possible to obtain a portable telephone device with incorporated projector 10*a* which has a simple structure, at a cheap price.

In the above explanation, the period of 2 seconds in the decision processing of the step S12, and the period of 0.5 seconds in the decision processing of the step S17, were only cited by way of example and are not limitative; these periods may be selected appropriately. If it is desired to improve the responsiveness, it would also be acceptable to arrange for these decision time periods to be 0 seconds.

The type of the portable telephone device with incorporated projector may be any of the folding type described above, or a type in which a rotating mechanism for the display section is added to the folding type, or the non-folding type described above, provided that it incorporates some movable mechanism which changes the state of the device. Furthermore, the angle which is used for making the decision upon the projection attitude is not limited to being 80°; it may be set as deemed to be appropriate.

Although in the above description an example was explained in which the projector module 6 was fitted to the portable telephone device with incorporated projector 10, it would also be acceptable to fit this projector module to an electronic device such as a notebook type personal computer, a PDA, an electronic camera, a replay device, or the like, instead of to the portable telephone device with incorporated projector 10.

Although, in the above description, various embodiments and variant embodiments have been explained, the present invention is not to be considered as being limited by the contents thereof. Other modes which are considered to lie within the range of the technical concept of the present invention are also included within its scope.

The contents of the disclosure of the following patent application, upon which priority is based, are hereby incorporated by reference:
Japanese Patent Application 2004-262420 (filed on Sep. 9, 2004).

The invention claimed is:

1. An electronic device, comprising:
a moving part;
a projector device provided in the moving part; and
a projection control unit that starts projection of an image by the projector device according to the state of the moving part,
wherein the projector device is configured to project the image away from the electronic device, and
wherein the projection control unit starts projection of an image when a first time period has elapsed with the moving part in a predetermined state.

2. An electronic device according to claim 1, wherein:
after projection of the image has started, the projection control unit terminates projection of the image when a second time period has elapsed with the moving part in a state that is different from the predetermined state.

3. An electronic device according to claim 1, further comprising:
a movement detection unit that detects movement of the electronic device, and wherein:
the projection control unit, when starting projection of the image by the projector device, starts projection of the image by the projector device when a third time period has elapsed during which a size of movement detected by the movement detection unit is less than or equal to a predetermined value.

4. An electronic device according to claim 1, wherein:
the electronic device is a portable telephone.

5. An electronic device according to claim 1, wherein:
the electronic device is a portable telephone comprising an actuation section and a display section, foldable around a hinge unit as a center;
the moving part corresponds to the display section; and
the predetermined state is that the display section is in a predetermined angular state with respect to the actuation section.

6. An electronic device according to claim 5, wherein:
the projector device performs keystone correction corresponding to the predetermined angle.

7. An electronic device according to claim 1, further comprising:
an actuation section, wherein:
the moving part moves relative to the actuation section; and
the moving part and the actuation section are configured to be foldable relative to each other.

8. An electronic device according to claim 1, wherein:
the projection control unit judges a state of the moving part and starts projection of an image by the projector device according to the judged state of the moving part.

9. An electronic device according to claim 1, wherein:
the moving part is pivotally connected to a base part of the electronic device such that the moving part can be folded to a closed position in which an inside surface of the moving part faces the base part and an outside surface of the moving part opposite the inside surface faces away from the base part, and wherein the projector device is arranged to project the image from the outside surface.

10. An electronic device, comprising:
a projector device;
a movement unit that detects movement of the electronic device; and
a projection control unit that starts projection of an image by the projector device, when a first time period has elapsed during which a size of movement detected by the movement detection unit is less than or equal to a predetermined value.

11. An electronic device according to claim 10, wherein:
after projection of the image has started, the projection control unit terminates projection of the image when a second time period has elapsed during which the size of movement detected by the movement detection unit is greater than the predetermined value.

12. An electronic device according to claim 10, wherein:
the movement detection unit comprises an attitude sensor, and detects the size of movement from an output value of the attitude sensor.

13. An electronic device according to claim 10, further comprising:
an image-capturing unit that captures images of an object to be photographed at predetermined time intervals and outputs image-capturing signals, wherein:
the movement detection unit detects the size of movement using interval change of the image-capturing signals outputted from the image-capturing unit.

14. An electronic device according to claim 10, further comprising:
a moving part, wherein:
the projector device is provided to the moving part; and
the projection control unit, when starting projection of an image by the projector device, starts projection of the image when a third time period has elapsed with the moving part in a predetermined state.

* * * * *